Figure 1:
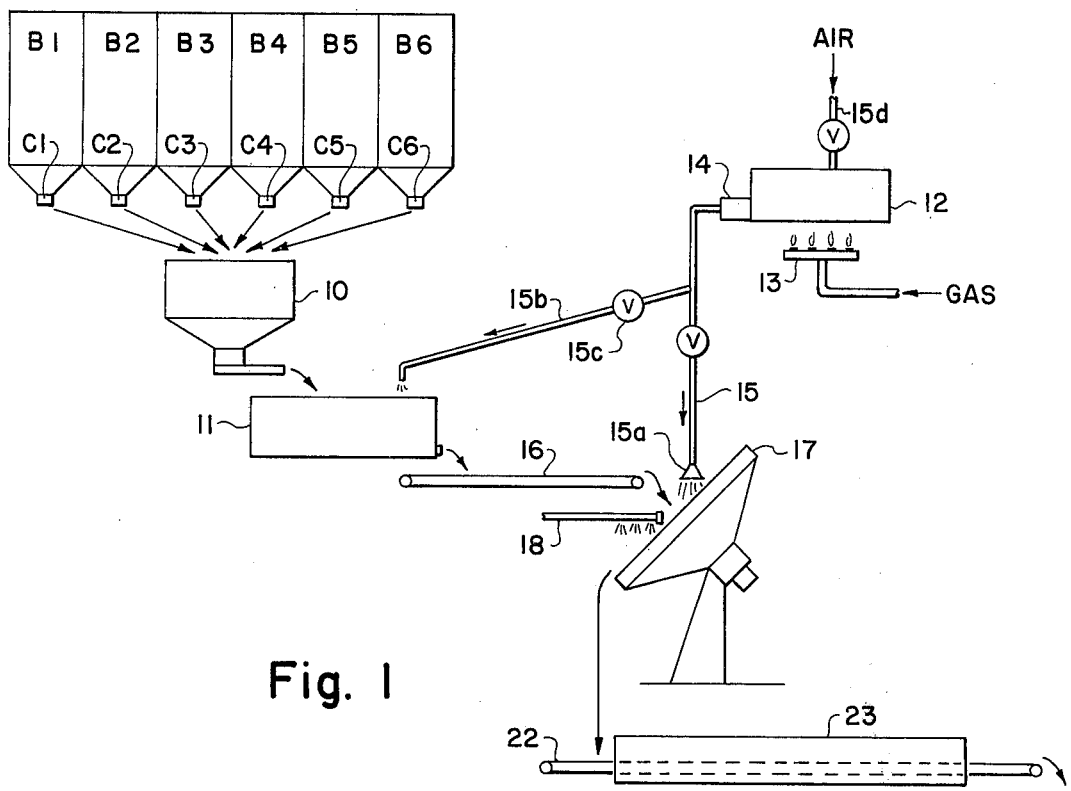

United States Patent [19]
Engelleitner et al.

[11] 3,914,364
[45] Oct. 21, 1975

[54] METHOD OF PELLETIZING GLASS BATCH MATERIALS

[75] Inventors: William H. Engelleitner, Coraopolis; Samuel B. Floyd, Jr., Wexford, both of Pa.

[73] Assignee: Dravo Corporation, Pittsburgh, Pa.

[22] Filed: Dec. 27, 1973

[21] Appl. No.: 428,881

Related U.S. Application Data
[63] Continuation-in-part of Ser. No. 167,342, July 29, 1971, abandoned.

[52] U.S. Cl. .............................................. 264/117
[51] Int. Cl.² ........................................... B01J 2/14
[58] Field of Search .......... 264/117; 106/52, DIG. 8

Primary Examiner—Robert F. White
Assistant Examiner—J. R. Hall
Attorney, Agent, or Firm—Parmelee, Miller, Welsh & Kratz

[57] ABSTRACT

A method of forming raw glass-batch materials into pellets of substantially uniform size and composition on a pelletizing disk comprises the use of silica sand such as Oklahoma sand as mined and heretofore considered too coarse for satisfactory pelletizing by using fine-ground limestone and/or dolomite to provide a mix of the sand and fine-ground ingredient having at least 15% by weight of all particles, on an average, under 325 screen mesh size and at least 25% of all particles under 200 mesh with no material percentage of particles over 50 mesh, wherein all, or most of the NaO equivalent is provided by a concentrated solution in liquid form of caustic soda, highly concentrated solutions being heated above their melting points, with all, or most of the caustic solution, first contacting the mixture of solid particles on the pelletizing disk where it forms an effective bonding medium.

5 Claims, 2 Drawing Figures

U.S. Patent  Oct. 21, 1975  3,914,364

METHOD OF PELLETIZING GLASS BATCH MATERIALS

This application is a continuation-in-part of application Ser. No. 167,342, filed July 29, 1971, now abandoned and relates to and is for a method of pelletizing glass-forming batch materials.

BACKGROUND OF THE INVENTION

The major raw ingredient from which glass is prepared commercially, other than cullet (which consists of waste glass that has been crushed for re-use and which therefore is not strictly a raw batch material) is silica sand ($SiO_2$) which may comprise around 50 to 60% of the entire raw batch. An alkaline compound of sodium, commonly soda ash ($Na_2CO_3$) or caustic soda (NaOH) is the next most important raw batch ingredient percentage-wise, perhaps as much as 20% calculated as the $Na_2O$ equivalent being used. An oxide producing alkali earth compound selected from the group consisting of limestone, dolomite and combinations thereof is a third major raw ingredient. Various other compounds, such as fledspar, borax, potash, fluorspar, zinc oxide and lead oxide are also used in small amounts, depending on the kind of glass to be made. The various compositions are well known in the art and the present invention is not primarily concerned with the particular formula. Also, the present invention is not concerned with the cullet.

The successful pelletizing of iron ore for use in blast furnaces with its resulting benefits and economy has given impetus to the possible use of pelletizing of other raw materials of a mineral character for use in other industries, including the glass industry. In the flat glass industry, for example, batch materials are continuously melted at one end of a large capacity furnace and the melted glass removed at a high rate from the other end. The advantages of combining the raw batch materials into compacts for melting have been recognized and referred to in prior patents and publications. In this connection reference may be made to U.S. Pat. Nos. 3,542,534 to Yamamoto, dated Nov. 24, 1970; 2,366,473 to Bair dated January 1945, and Pelletizing the Glass Batch by Yamamoto, et al. in the September 1968 issue of the Glass Industry, p. 491, and German Pats. Nos. 1,814,624 published July 17, 1969 and 1,952,274, published June 4, 1970. We also refer to an article written by the herein-named co-inventor William H. Engelleitner appearing at page 24 of the December 1966 edition of Ceramic Age, entitled "Pelletizing Disc Applications In Ceramic Processing".

Superficially, it appears that the commercially economical pelletizing of raw glass batch ingredients would present no special problem in view of the successful practices of pelletizing other materials, notably iron ore, but for various reasons this is not the case, and precedures heretofore proposed are too costly or too unsatisfactory for widespread commercial use. After the pellets are rolled, they must have adequate strength to resist in-shop handling until they are hardened, and they should desirably be hardened at low temperature, i.e., below the temperature where the glass-forming reactions or fluxing such as would fuse the pellets together or soften them occurs. The hardened pellets should be non-hygroscopic and strong enough for bulk storage; substantially non-powdering, and organic or other binders which can be used in pelletizing the ingredients used in other industries may be detrimental or cause discoloration of the glass and are therefore of little or no practical use for commercial application in the manufacture of glass. Because of the highly abrasive nature of the silica sand which results in rapid wear of extrusion or briquetting dies, agglomeration in equipment of this kind is not commercially expedient and pelletizing drums used in making ore pellets are not satisfactory for glass batch pelletizing because of the non-uniformity both of the size of the agglomerates and of their composition, and other reasons.

In the early and middle 1950's Dravo Corporation, by whom we were employed in research at the times herein referred to, had extensively participated in the commercial production of iron ore pellets by industry in the United States and Canada and had gained wide experience with the rolling of pellets on an inclined pelletizing disk. Against this background and in connection with the activities of Dravo Corporation, we conducted extensive research in pelletizing glass batch ingredients. Beginning in 1958 and subsequently as Dravo Corporation employees we have made studies for various glass companies, trying at times their formulae and our own formulae for producing pellets for the manufacture of such products as containers, flat glass, pressed and blown glass, fiberglass and technical and optical glass. Such studies have in some cases included runs made with Dravo-built equipment at the Dravo research laboratory and also with similar equipment at a prospective customer's plant. Only recently have we achieved results which we consider to be satisfactory and commercially expedient for the manufacture of flat glass, container glass and technical glass.

In the pelletizing of ore concentrate little difficulty is encountered because the concentrates are of generally uniform consistency as to maximum particle size and composition and there is not involved the inclusion in each pellet of generally uniform percentages of each of the several different ingredients needed to produce glass. In pelletizing glass batch ingredients, it is important that within limited tolerances, each pellet shall contain each batch ingredient in the proper ratio to other ingredients in the entire batch; one must not be predominantly soda, another predominantly silica, etc. Nevertheless the rolling of pellets tends to be inherently of a selective character; some particles adhere more readily than others; some retain moisture or adsorb moisture differently from others and fines form balls readily, tending to reject coarser grains, etc. This selectivity defeats the uniformity of composition between pellets which is necessary for glass batch agglomerates.

Many others in this industry have attempted to pelletize glass batch ingredients, and they early recognized that if all of the ingredients could be reduced to a particle size of 200 mesh screen and under, pellets could be successfully formed in a continuous and stable manner. Most successful results were secured by us and others researching in this field when the silica was reduced to a powder. Patent to Yamamoto U.S. Pat. No. 3,542,534 above mentioned specifies pulverizing the silica to particles finer than 0.25 mm (60 mesh) with at least 60% being finer than 0.15 mm (100 mesh). Pulverized silica of this quality has been commercially available from several sources, one well known brand being available under the trademark "Supersil". In Bair U.S. Pat. No. 2,366,473 it is proposed to use ordinary batch sand along with soluble flux and detritus from the grinding of plate glass, or potter's flint, which is powdered silica, or both. Both Yamamoto and Bair therefore are open to the same objection, that is the required fine grinding of silica. Because of the highly abrasive nature of silica, this is expensive particularly due to the excessive maintenance cost of the grinding equipment and associated machinery.

SUMMARY OF THE PRESENT INVENTION

We have discovered that certain naturally occurring silica sand can be used as mined, that is with only the usual coarse screening and washing, to produce strong pellets of selected uniform size and composition on a continuous and economical basis if we observe the following conditions:

1. If the sand is a sand of the type found in Oklahoma such as that sold commercially under the trade name "Mid-Continent", but substantially similar deposits of which are found elsewhere, which typically has no particles over 30 mesh screen size, an average of only 2% of its particles being between 30 and 50 mesh and the greatest percentage of its particles is between 50 and 200 mesh with less than 4% under 200 mesh and less than 1% under 325 mesh. Even though this is finer than typical glass sand generally used, which typically will average about 42% of +50 mesh particles and 95.3% of +200 mesh particles, including of course the 42% of +50 mesh particles, we find it too coarse to pelletize satisfactorily other than by, following the procedure herein disclosed.

With our invention, we use with this Oklahoma type sand limestone either calcium carbonate or calcium magnesium carbonate, known as dolomite limestone, or both, of a so-called commercial "fine grind". Both are far less abrasive than silica and fine grinding is accomplished at a price which is low enough to enable it to be used. Both types, on an average, range from a trace of particles exceeding 100 mesh to 4%, with none, for all practical purposes, over 30 mesh. In fine-ground limestone commercially available, in a typical batch 24% of all particles by weight will remain on a 325 mesh screen, while the remaining 76% is finer than 325 mesh. With fine ground dolomite limestone, about 32.5 by weight will remain on a 325 mesh screen and roughly 68% is below 325 screen mesh.

We have found that using the Oklahoma type sand and the fine ground limestone of either type or a mixture thereof in such amount that 15% or more of the total particles will average under 325 screen mesh size and at least 25% of all particles in the mix will average under −200 mesh, the required formula for the glass may be met and that, with the further procedure next to be described, good, firm pellets of generally uniform size will result.

2. All, or at least most of the sodium oxide, $Na_2O$, requirement of the glass formula is supplied as the equivalent through the use of a concentrated solution of caustic soda (NaOH) in a liquid form, and we say "liquid form" because above about 50% NaOH concentration a caustic solution will be a solid at room temperature but will become liquid when heated, a 73% solution reaching a liquid condition where it may be sprayed at 140°F. We prefer to use a solution in the 60 to 73% range and therefore to use it hot, since with the highly concentrated solution it will form firmer pellets and supply the entire NaO equivalent for the glass batch so that the usual soda-ash ($Na_2CO_3$) used as a batch ingredient is then usually unnecessary, although small amounts of soda ash may, if desired, be used.

3. The pellets to be formed from these ingredients must be rolled on an inclined rotating pelletizing disk, since a pelletizing drum such as a drum used in pelletizing ore cannot avoid a rapid build-up of caustic soda on the interior or yield pellets of average uniform selected size or composition. The silica sand and fine ground alkaline earth carbonate, limestone or dolomite, or both, must be thoroughly mixed and discharged dry, or with only a small amount of the caustic soda solution premixed therewith, onto the pelletizing disk and the heated liquid caustic solution sprayed onto the material on the disk as the material forms or "snow-balls" into pellets. The importance of supplying the mix to the pelletizing disk dry, or with only a small amount of the total required caustic solution contained therein is that there is a reaction between caustic soda solution and silica when they are brought into contact which tends to bond the premixed particles together to such extent that the normal ball-forming process on the pelletizing disk cannot proceed.

After the pellets have been formed and rolled to the selected size range they are discharged from the disk in the usual manner and then dried and hardened at a temperature below that at which they will not soften or fuse together.

Figure 2:
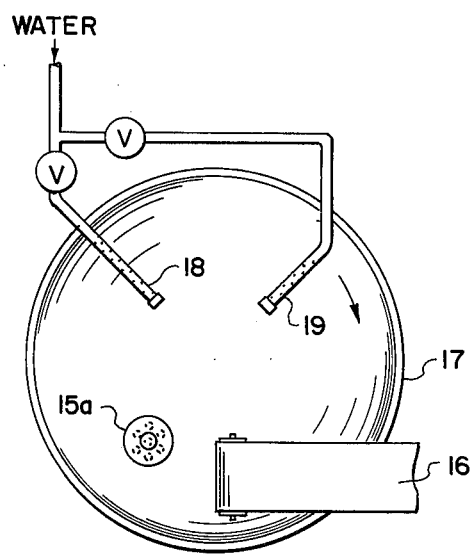

The invention may be more fully explained in conjunction with the accompanying drawing, wherein:

FIG. 1 is a schematic diagram illustrating a preferred apparatus and method for the practice of the invention; and FIG. 2 is a plan or face view of the inclined pelletizing disk with a schematic representation of a preferred method of feeding ingredients thereto.

Referring to the drawings, and first to FIG. 1, there are a series of separate bins B1 to B6 in which the several raw batch-forming ingredients are stored and from which these materials are continuously fed in proper proportions by weigh-feeders C1 to C6 from bins B1 to B6, respectively, into a common batching hopper 10 where they are preliminarily mixed. From the hopper 10 the initially mixed ingredients are continuously delivered at a controlled rate to a batch mixer 11. There is a separate vessel 12 which may have a heating means 13 providing a container for caustic soda solution. For caustic soda solutions of around 50% concentration of lower, which are liquid at room temperature, the heater 13 is not necessary, but since solutions which we usually prefer to use are of 60 to 73% concentration are solids at room temperature but liquefy upon heating, a heating means is usually needed. As previously indicated, the concentration of the solution may vary according to the requirements of a particular glass formula. Commonly two concentrations are sold commercially—one a 50% NaOH concentration, and one 73%. The stronger one, having a melting point of 140°F, may be diluted with water or with the weaker one, or the weaker one made stronger by combining it with a stronger one. Typically for flat glass as presently made the 73% solution is preferable, but for some glass a concentration as low as 60% has been found desirable. The caustic soda is continuously fed from the vessel 12 through a proportioning or measuring means 14 and, if need be, a thermally insulated valved conduit 15 to discharge spray head 15a positioned over the pelletizing disk. There may be a branch pipe 15b with a valve 15c through which a small amount of the solution may, but rarely will be, applied to the mixer. For assuring a proper discharge from the spray head 15a, we have indicated a pipe 15d for supplying air under pressure to the vessel 12 as indicating a means to apply adequate pressure to the solution.

The batch ingredients from the mixer are continuously supplied to a pelletizing disk 17, a conveyor 16 being illustrated for transferring the mix of solid ingredients to the pelletizing disk. The location of the feed input over the disk and the location of the spray head 15a are selected according to usual procedures and the pellets are discharged from the lower edge of the disk. The slope and speed of rotation of the disk which, as usual in pelletizing disks, can be varied, are important but the angle or speed cannot be emperically stated since the size of the disk, the rate of feed of the ingredients and other variables require some changes from time to time. However, one skilled in the art can readily determine this by experimenting in the same way that optimum conditions are determined for pelletizing other materials in other industries. Generally the disk will slope in the range of 40° from horizontal to approximately 60° and the speed of rotating the disk or pan will be of the order of 5 to 25 R.P.M., depending on the size of the disk. Also as shown in FIG. 2, water may be selectively supplied to the disk through nozzles 18 and 19 from a supply pipe 20 and valves 21.

The disk preferably has a non-metallic surface or has a protective layer thereover which is wear-resistant and chemically inert to the caustic. Epoxy resin, for example, may provide such a protective layer. The mixture from the mixer 11 is preferably charged onto the rotating disk 17 in that segment, which, if FIG. 2 is considered as the face of a clock, is between the 6 o'clock and 7 o'clock positions. Water, if used, will generally be sprayed onto the peripheral area of the disk through nozzle 18 in the region between 9 o'clock and 11 o'clock perhaps closest to the 10 o'clock area as viewed in FIG. 2. Other water may be applied in toward the center of the disk at or near 2 o'clock position as indicated at 19. The total uncombined water should not substantially exceed about 15% by weight in the resulting green pellet. Pellet size is effectively controlled by the usual procedures, above mentioned, that is, varying the slope, speed and especially feed and spray locations and rate of feed. With caustic solutions up to about 50% concentration, no heat is ordinarily required to keep the caustic solution liquid, but with the preferred concentration of 60% or higher, heat is required, 73% concentration requiring that the solution be maintained at a temperature of about 140°F to remain sufficiently liquid to spray.

From the disk the pellets are continuously charged onto and carried by conveyor 22 through an oven 23 where they are heated to dry and harden them. It may be explained that the caustic soda will flux and react with or dissolve other ingredients in the pellets, whereupon the pellets will soften and deform and fuse together at moderate temperatures. Heating is therefore effected somewhere between 100°F and below the temperature where the pellets begin to soften. Typically, this may be around 500°F and the longer the retention time of the pellets in the oven, the lower is the required temperature. One advantage of using a highly concentrated caustic soda solution which is a solid at room temperature, aside from supplying all or a high percentabe of the equivalent required $Na_2O$ in the glass formula, is that as the newly formed pellets cool, strength will be added to the newly-formed pellets as they cool by the solidifying of the caustic soda solution. Typically, the diameter of the selected size of the pellets will be from ± ⅜ to ½ inch and up to ± ⅝ inch, but whatever the selected diameter, the pellets will hold reasonably close within this selected size range. Conventional hardness tests with the pellets gave the following results:

Moist compressive strength around 4 to 6 pounds.
Dry compressive strength around 75 to 220 pounds.
Pellets so made are non-powdering and have been stored in open bins for as long as 45 days, absorbing as much as 5% of moisture, but they still remained hard and stable, showing no apparent ill effects. The performance of the pellets in large continuous glass melting furnaces has not been tested but the melting of small batches indicated they will be entirely satisfactory.

An ideal procedure is to hot spray all of the caustic soda required to provide the $Na_2O$ equivalent of the glass formula onto the mix of other ingredients on the disk and thereby reduce the amount of free water introduced into the pellets, the hot caustic constituting the binder, but with a high percentage of sodium oxide in the glass, or using less than a 73% NaOH solution, some of sodium oxide requirement may be supplied as soda ash to the ingredients in the mixer, or with weak NaOH solution some of the solution may be supplied, as above described, to the mixer. The reason why only a little NaOH may be supplied to the mixer is that it reacts with the silica to form a silicate which, as previously explained is a bond that is sufficient to interfere with subsequent pellet formation. This same reaction explains, which also the reason why the mixture of Oklahoma type sand and other dry ingredients herein described that will not pelletize under usual conditions will form balls with a concentrated solution of NaOH on a pelletizing disk.

When using a 73% concentrated caustic solution of pellets having a uniform size and composition cannot be continuously and satisfactorily produced using Oklahoma type sand, as above described, unless the dry batch comprises at least 25% by weight of all particles of minus 200 mesh screen size with at least 15% by weight being minus 325 mesh size, with no particles, at least for all practical purposes, over 30 mesh and the bulk of all of the particles by weight should be in the 100–200 mesh range. The fine grinding of the limestone and/or dolomite, as hereinafter described, enables this composition of the batch to be compounded while keeping the ratio of alkaline earth carbonate (as provided by limestone and/or dolomite) to silica in the correct relationship. As above pointed out, the limestone and dolomite are relatively non-abrasive and may be economically fine ground, whereas silica sand is highly abrasive to the grinding equipment, so that the present invention makes possible the use of a specific naturally occurring type of sand as mined by the fine grinding of the limestone-dolomite ingredients and the use of a concentrated solution of caustic soda as the only or principal source of $Na_2O$ equivalent in the batch.

Other commercially available silica sand which is similar to Oklahoma may be used. The typical or average composition of such a sand expressed as the cumulative percent by weight retained on a U.S. standard mesh screens is as follows:

| | |
|---|---|
| + 30 mesh | trace |
| + 50 mesh | 2.2% |
| +100 mesh | 44.8% |
| +200 mesh | 96.9% |
| +325 mesh | 99.7% |
| −325 mesh | 0.3% |

Typical finely ground limestone shows the following, rated in the same way:

| | |
|---|---|
| + 30 mesh | 0.32% |
| + 50 mesh | 0.82% |
| +100 mesh | 3.6% |
| +200 mesh | 13.5% |
| +325 mesh | 23.7% |
| −325 mesh | 76.3% |

Typical fine-ground dolomite has the following analysis, similarly rated:

| | |
|---|---|
| + 50 mesh | trace |
| +100 mesh | trace |
| +200 mesh | 9.5% |
| +325 mesh | 32.5% |
| −325 mesh | 67.5% |

In other words, the typical Oklahoma type silica sand which we use, as mined with only washing and coarse screening, has less than 1% of fines under 325 mesh and about 3.2% below 200 mesh and the greatest percentage is between 50 and 100 mesh. Limestone, however, showed about 76.5% below 325 mesh, and 86.5% below 200 mesh and the percentage between 50 mesh and 100 mesh is very small. Likewise, with dolomite 67.5% is under 325 mesh, 90.5% under 200 mesh and has practically no grains between 50 and 100 mesh or larger. Since percentages herein appearing are typical or average, it may be expected that there will be inconsequential variations from the exact percentages herein set forth among the pellets in a given lot.

The grit sizes are the standard U.S. A.S.T.M. screen sizes, but the exact proportions should be regarded as typical or an average.

Summarizing, we have found that in any operation on a pelletizing disk standard coarse sand, limestone and dolomite mixtures cannot be pelletized, even with hot concentrated caustic soda, and we have found and confirmed that if very finely pulverized sand is used as the only source of silica the batch will pelletize satisfactorily however, since there is typically in a glass batch around 60% by weight of sand to around 20% by weight of limestone and/or dolomite and a sodium compound sufficient to provide around 20% $Na_2O$ equivalent, the cost of pulverizing so large a percentage of the total batch would be prohibitive for most commercial glass products. We have discovered that using a commercial grade of Oklahoma and similar types of sand as mined as the principal single batch ingredient with the alkaline earth mineral, either limestone or dolomite, and commonly some of each, being fine-ground, pellets of generally uniform size and generally uniform composition can be rolled on a pelletizing disk using concentrated caustic soda solution in liquid form as binder and in an amount sufficient to provide all of the $Na_2O$ requirement of the glass, or most all where the concentration of the solution is too low to meet the entire requirement. Any solid ingredients used in addition to or as a substitute for part of the major ones above named are also ground to a fineness where the typical particle sizes of the entire mix remain unchanged. In other words, it is to be understood, of course, that the materials charged in the several bins B1 to B6 other than silica and limestone and dolomite, of which there may be more or less depending on the ingredients required for a particular glass batch, are of such fineness as to produce a mix having substantially the particles thereof of such average size that they will not decrease the percentage of particles under 325 mesh below 15% or the proportion under 200 mesh below 25% or otherwise appreciably increase the ratio of large particles to smaller ones, although an increase in proportion of smaller size particles to larger ones is entirely acceptable and even desirable.

We claim:

1. A method of forming pellets of raw glass batch ingredients for use in producing a glass having $SiO_2$ as the principal constituent with $Na_2O$ and an oxide selected from the group consisting of CaO, MgO and mixtures thereof as the other most important constituents percentage-wise in the glass formula comprising
    a. preparing a mixture of:
        i. a naturally occurring washed silica sand otherwise in its as-mined state which has less than 1% of particles by weight under 325 screen mesh size and only about 3.2% of particles under 200 mesh, the remainder of the particles in the sand being in the range between 50 and 200 mesh;
        ii. ground limestone selected from the group consisting of calcium carbonate and calcium-magnesium carbonate and mixtures thereof, the ground limestone comprising between 67.5 to 77.5% by weight of particles under 325 mesh, 86.5% under 200 mesh, the remaining particles being in the range of 50–200 mesh;
        iii. the silica and limestone being combined in such proportions that there are no solid particles in the mix above 30% mesh, but at least 15% by weight of all particles are of −325 mesh size and 25% of all particles are of −200 mesh and the greatest percent by weight of all particles is in the range between 100 mesh and 200 mesh;
    b. continuously feeding said mix in a free-flowing unagglomerated condition onto a rotating pelletizing disk;
    c. continuously supplying to the mix a sodium hydroxide solution ranging between 50 and 73% concentration in a liquid state with at least the greatest proportion of the total amount of the solution necessary to effect bonding being continuously fed directly to the mix on the rotating disk, any proportion of the required sodium hydroxide solution which is not fed directly to the mix on the rotating pelletizing disk being in an amount insufficient to interfere with the free-flowing unagglomerated condition of the solid particles as they are supplied to the disk is supplied to the solid particles in advance of their being supplied to the pelletizing disk;
    d. rolling the mixture of solid particles and sodium hydroxide solution on the disk into pellets of substantially uniform composition, the sodium hydroxide constituting the bonding medium for the solid particles and providing at least most of the equivalent $Na_2O$ required by the glass formula;

e. discharging the pellets of selected size from the disk, and f. drying the pellets.

2. The method defined in claim 1 wherein water is also supplied to the materials on the pelletizing disk, but only to the extent that the total free water in the pellets does not exceed 15% by weight of the pellets at the time of formation of the pellets.

3. The method defined in claim 1 in which all of the sodium hydroxide solution used in producing the pellets is supplied to and first contacts the mix of solid particles during the time the materials are on the pelletizing disk.

4. The method defined in claim 1 wherein the sodium hydroxide solution provides the entire $Na_2O$ equivalent for the glass formula and the solution is in the range between 60 and 73% NaOH concentration where it is normally solid at room temperature and it is first converted by heat to a liquid state and supplied to the mix of solid particles on the pelletizing disk as a heated spray.

5. The method defined in claim 1 in which the selected size of the pellets ranges between about one-half and five-eighths inch.

* * * * *